United States Patent
Kanevsky et al.

(10) Patent No.: US 6,738,535 B2
(45) Date of Patent: May 18, 2004

(54) HEAD-MOUNTED DISPLAY CONTENT TRANSFORMER

(75) Inventors: Dimitri Kanevsky, Ossining, NY (US); Jeffrey S. Sorensen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 09/774,489

(22) Filed: Jan. 31, 2001

(65) Prior Publication Data

US 2002/0138249 A1 Sep. 26, 2002

(51) Int. Cl.$^7$ .............. H04N 1/40; G06F 7/00
(52) U.S. Cl. ............. 382/312; 358/462; 704/2
(58) Field of Search ............ 358/474, 1.12, 358/1.18, 462; 382/312, 185, 198, 176; 704/2

(56) References Cited

U.S. PATENT DOCUMENTS

| | | | |
|---|---|---|---|
| 5,145,376 A | * | 9/1992 | Krass ................... 434/157 |
| 5,727,082 A | | 3/1998 | Sugishima |
| 5,924,108 A | | 7/1999 | Fein et al. |
| 6,141,443 A | | 10/2000 | Nakao et al. |
| 6,539,116 B2 | * | 3/2003 | Takaoka ................ 382/229 |
| 2002/0077805 A1 | * | 6/2002 | Hechts ..................... 704/2 |

FOREIGN PATENT DOCUMENTS

| | | | |
|---|---|---|---|
| DE | 01920432 A1 | * 12/1996 | ........ G06F/17/28 |
| JP | 405204920 A | * 8/1993 | ........ G06F/15/00 |

\* cited by examiner

*Primary Examiner*—Jerome Grant, II
(74) *Attorney, Agent, or Firm*—Ference & Associates

(57) ABSTRACT

Apparatus, and associated methods, for transforming an image. The apparatus includes an aiming device to be aimed at an original stationary image, a transforming device which transforms the image into a revised image, and a displaying device which displays the revised image. The revised image may be related linguistically or pictographically to the original stationary image, or the revised image includes a label assigned to at least one pictographic property of the original stationary image. Uses of the apparatus include, but are not limited to, translating text from one language to another, simplifying text within the same language and labelling text with one or more pictographic icons. The apparatus can include glasses or goggles that are worn by a user and in which an image, corresponding to the revised image, is projected or displayed on at least one lens area.

33 Claims, 4 Drawing Sheets

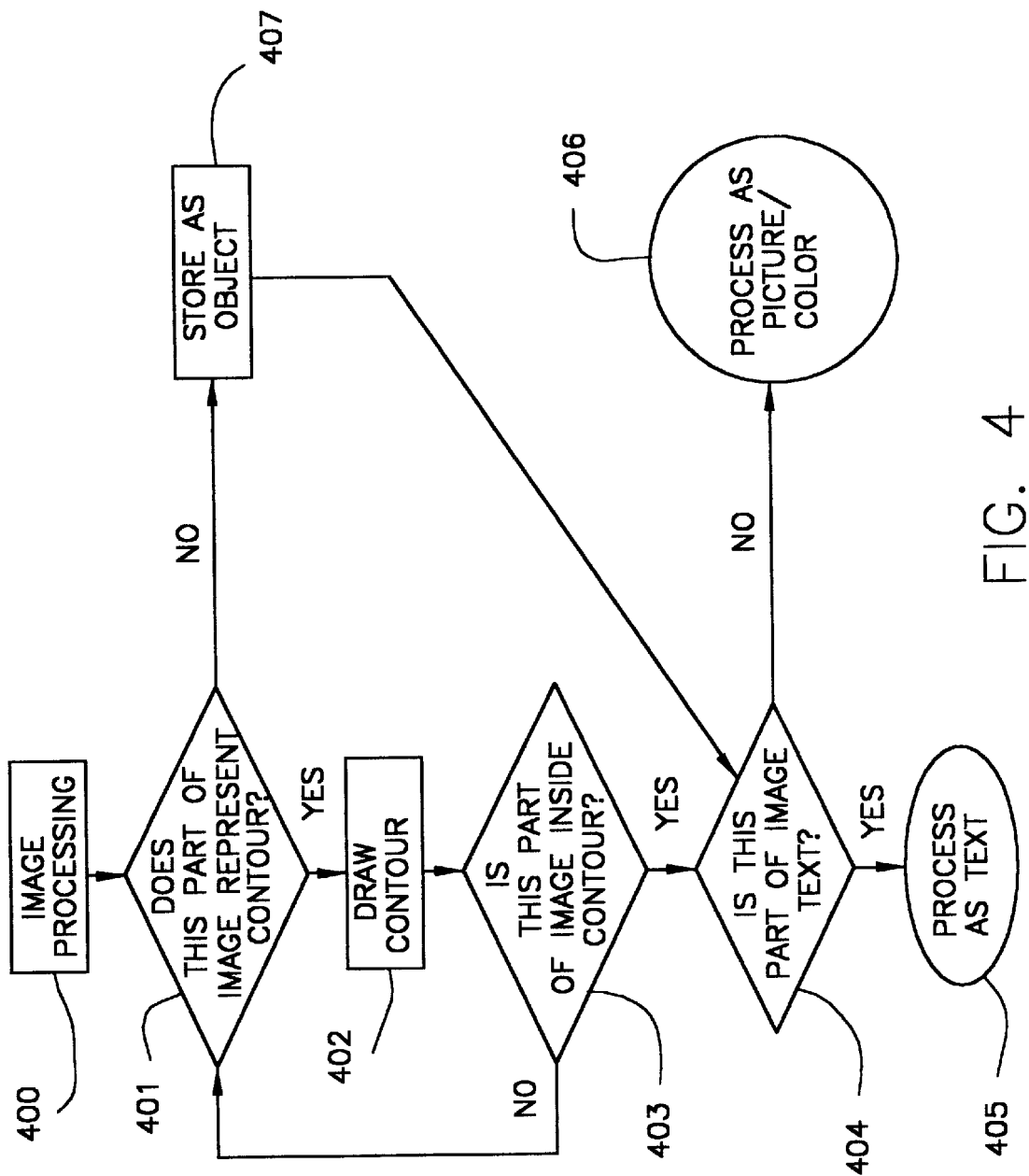

HEAD-MOUNTED DISPLAY CONTENT TRANSFORMER

FIELD OF THE INVENTION

The present invention relates generally to devices and methods for facilitating the processing of text and/or images.

BACKGROUND OF THE INVENTION

Not being able to understand linguistic input can often be immensely frustrating, whether it be something in a person's native language that is too complex or something in a language in which the person is not proficient. For example, when a person cannot understand something they are reading it can be very frustrating since, not only do they not understand the context of what they are reading, but they also lose important information that they might need to use shortly thereafter. To assist in this regard, there are many services or devices, in existence today, that assist with translation. They include translation scanners and/or machine translators, translation services, live help via Internet or person, translators, and many more. Many devices and services also assist in simplifying complex linguistic input for individuals having such a need. For instance, there exist web sites that are accessible for handicapped, voice browsers (that permit accessing of the Internet by voice).

All of these services and devices can often be useful, but of them has its shortcomings and faults. For example, translation scanners (i.e., digital pens that can scan text and translate it, wherein text is displayed on a small screen attached to a digital pen or via voice) are helpful but the process involved can take a very long time, thus resulting in logistical disruptions while involving high costs. Machine translation is also useful, except that it is very time consuming in that it involves recognizing text, including different forms of scripts, and can often prove incorrect. Translation services, e.g., over the Internet, such as Babelfish at, or over the telephone, such as provided by AT&T for medical emergency rooms) are often not dependable because of the quality of their site or service. For instance, in the case of telephone translation services, it is usually necessary to find an interpreter for the particular linguistic requirements in need, while in the case of Internet services there often exist delays. Finally, live help, such as via the Internet or even in person, is often not simply time consuming but costly as well.

Each of the tools described above can of course assist considerably with translation tasks, but have been found to be lacking in accessibility and productivity. For example, when a child is reading a book or a person with a disability is reading a newspaper, they may find it hard to comprehend the text. For such individuals, each of the previously described tools can be difficult to access and, in the end, elusive in producing something of use. Problems, thus, could be presented during live meetings, where many documents might be handed out, or in the context of a child reading a complex book, where there might be severe difficulties with comprehension.

Accordingly, a need has been recognized in connection with providing a user-friendly and productive translation device that will be able to aid people with disabilities, children, and users who are not proficient in a given language.

SUMMARY OF THE INVENTION

In accordance with at least one presently preferred embodiment of the present invention, broadly contemplated is a wireless head mount (e.g. in the form of glasses or goggles) that can assist in the tasks and address the problems and issues described heretofore. Preferably, the head mount will be adapted to perform a function in which essentially any form of text can be recognized, while taking into account prior knowledge of the user, in which the text can be translated or transformed into a form which will be easiest for the user to understand.

It is believed that the solutions described herein will be of great benefit to individuals with disabilities and to children, since existing translation and comprehension tools tend not to provide such users with a usable form of text. Since a service is now contemplated that translates text in the context of prior knowledge about the user, it should be appreciated that the service will be able to cater to, and thus satisfy, essentially any user. (For individuals with poor eyesight, it is conceivable to include text-to-speech translation as an adjunct. Thus, a head-mounted device could be aimed at some text that needs to be translated or simplified, and instead of arriving in the form of transformed text, it could arrive in the form of audible renditions of the translated or simplified text.)

As an example, a child who may be reading a complex book or may have trouble reading in general, can use the presently contemplated head mount to translate the text into either simpler form or maybe even into pictures.

The head mount, instead of displaying the text that the user is viewing, may display a translated format of the text directly on a lens of the head mount. Though a transparent lens on the head mount is presently contemplated, whereby overlayed text and graphics could be displayed on the lens with a distinct contrast as compared to the general background (e.g., the displayed matter could be much brighter than what is otherwise viewed through the lens), or the "lens", per se, could be opaque, whereby the user would essentially aim the head mount towards the item (e.g. text) whose appearance is to be transformed but wherein the user would only see the item in its tranformed state.

Overall the presently contemplated solutions are believed to permit users become more interested and actively involved in their reading and work, and thus may even result in accelerated learning for the individuals in question.

In one aspect, the present invention provides an apparatus for transforming an image, the apparatus comprising: an aiming device to be aimed at an original stationary image; a transforming device which transforms the image into a revised image; and a displaying device which displays the revised image.

In another aspect, the present invention provides a method for transforming an image, the method comprising the steps of: providing an aiming device; aiming the aiming device at an original stationary image; transforming the image into a revised image; and displaying the revised image.

Furthermore, the present invention provides, in another aspect, a program storage device readable by machine, tangibly embodying a program of instructions executable by the machine to perform method steps for transforming an image, the method comprising the steps of: providing an aiming device; aiming the aiming device at an original stationary image; transforming the image into a revised image; and displaying the revised image.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 4 schematically depicts a process of imager processing, contour recognition and object recognition.

DESCRIPTION OF THE PREFERRED EMBODIMENTS

Figure 1:
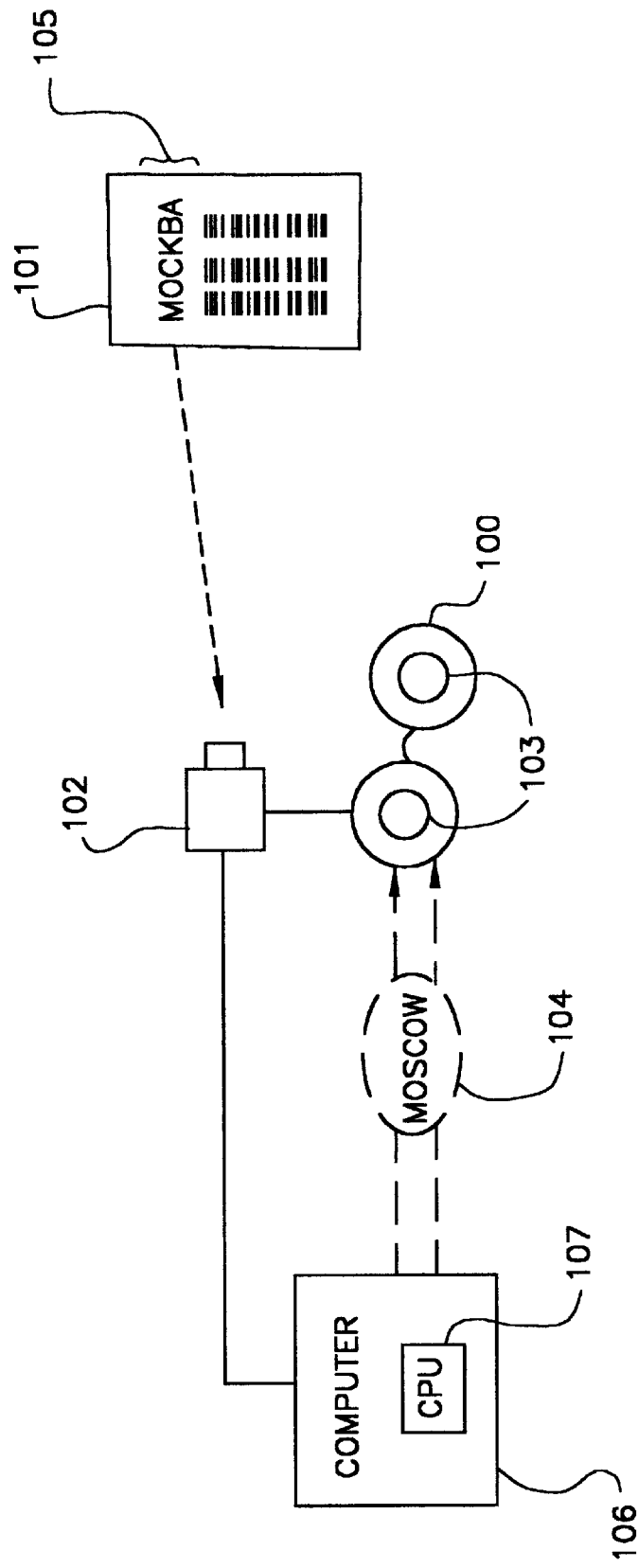
FIG. 1 is a schematic diagram depicting a head mount.

FIG. 1 is a schematic diagram depicting a head mount 100 in accordance with an embodiment of the present invention. Here, head mount 100 is depicted as glasses, but it may also be embodied by goggles or an analogous device which provides some degree of physical intervention between one or more of the user's eyes and the item being read. Optional headphones (not shown) could be used to provide auditory input for an individual with limited sight, though it is to be understood that even in such an instance it is still desirable that the individual be able to "aim" the head mount device at the item for which translation or simplification is desired.

A small camera 102 is preferably fixedly mounted on the head mount 100. Here, it is shown that the head mount 100 is aimed at a newspaper 101 that includes Russian text 105 ("MOCKBA"). The head mount 100 includes a small display area 103 (e.g., a lens area if the head mount 100 is embodied by glasses). Preferably, the display area 103 will be configured for displaying a transformed image 104. In this case, the transformed image 104 is "MOSCOW", which is English for the Russian (and Cyrillic alphabet) equivalent "MOCKBA" (105).

Preferably, a computer 106, with CPU 107, will have created the transformed image 106. The function of the computer/CPU 106/107 will be discussed in more detail below but, basically, the camera 102 finds an image 105 and then transfers it to the computer/CPU 106/107, where the image 105 is transformed into image 104 and sent to the display areas 103. Regarding image 104, it is possible to create an illusion of depth of field using two images due to stereo imaging phenomena. However, most displays have a fixed depth of focus which would restrict the placement of an image to be transformed at different focal lengths. Presumably, techonologies still to be developed might remove these restrictions. For present purposes, it should be understood that it is not essential that a transformed image be displayed in both eyes.

Figure 2:
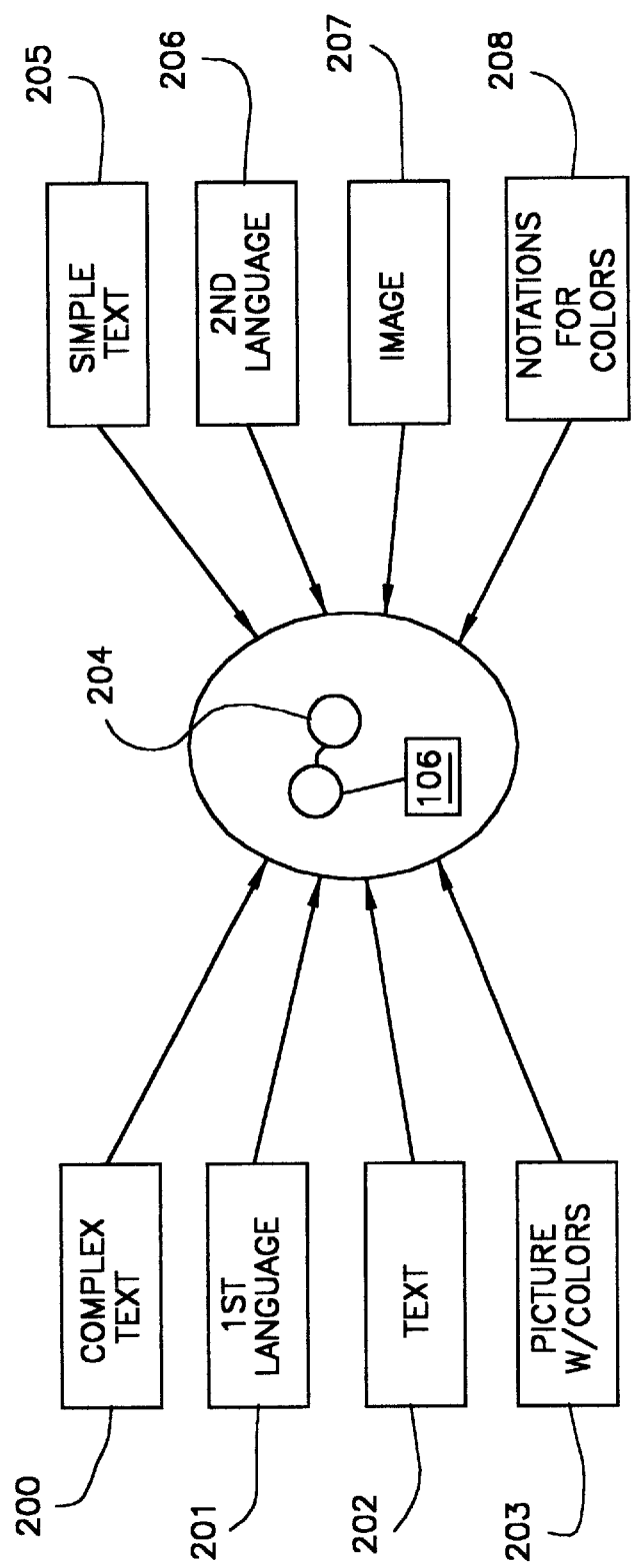
FIG. 2 provides examples of transformed data.
Figure 3:
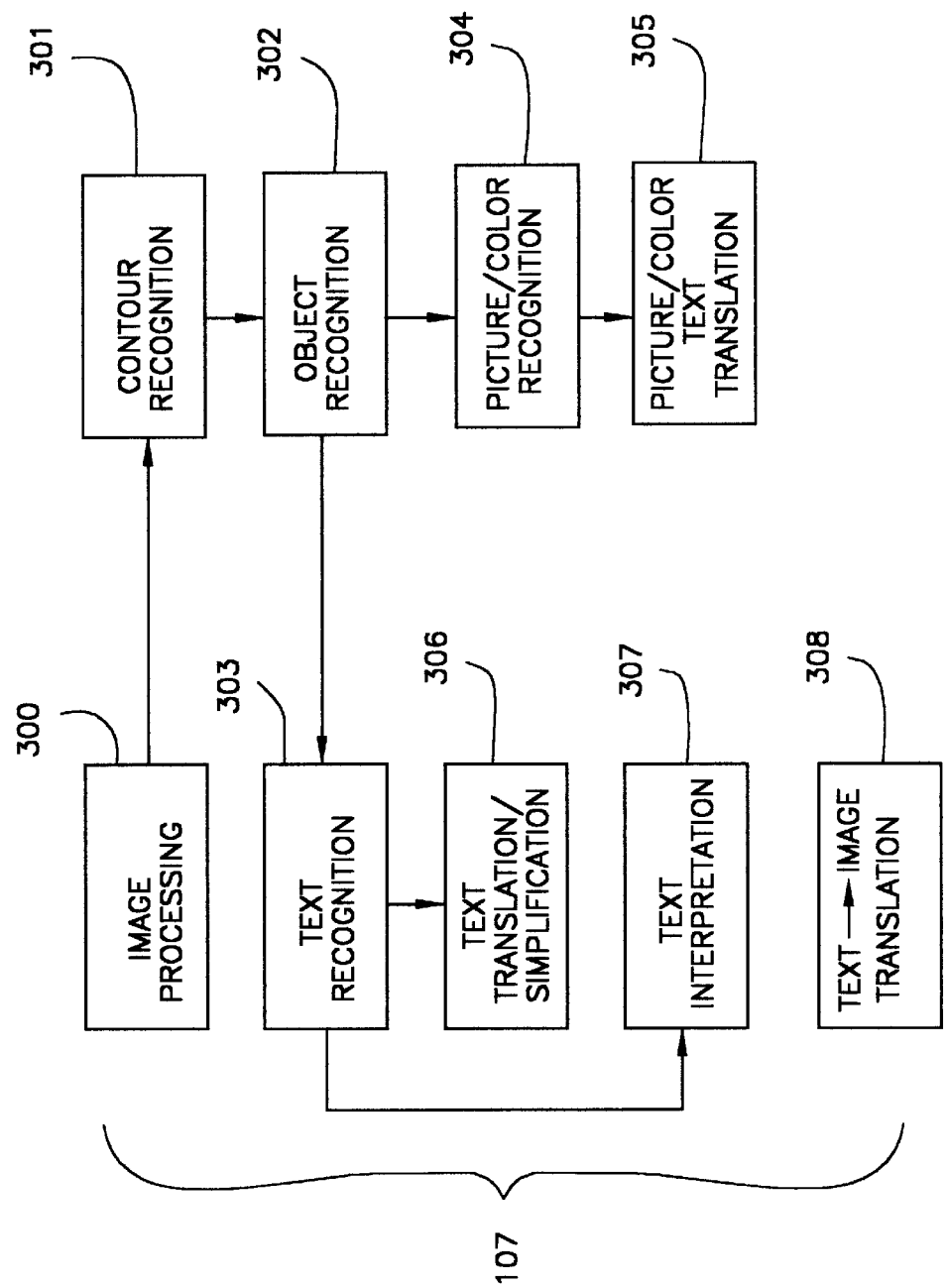
FIG. 3 schematically depicts a process undertaken by a CPU, showing the computer's role in translating.

FIG. 2 provides examples of transformed data. Indicated at 204 is a head mount in accordance with at least one embodiment of the present invention. Also shown schematically is the computer 106 that may transform original data (from the left) into more user-friendly, transformed data (on the right). Thus, illustrated are pairs of original data and transformed data. For example, for complex text 200 that is viewed, it can be transformed into simple text 205. Text in one language 201 may be transformed into text in another language 206. Text 202 can be transformed into an image 207. A color picture 203 can be transformed into a picture 208 with notations describing colors FIG. 3 schematically depicts a process undertaken by CPU 107 (see FIG. 1) in accordance with at least one embodiment of the present invention. At 300, an image is accepted from camera 102 (see FIG. 1) and processed. Preferably, this step will be similar to that described in copending and commonly assigned U.S. patent application Ser. No. 09/079,754 ("Apparatus and method for user recognition employing behavioral passwords", filed on May 15, 1998), particularly to the extent that the application described image processing technology such as digitization and quantization. That application is also relevant for background information on matters such as object recognition and contour recognition, to be addressed further below.

Next, the resulting digital data is checked for its contour in contour recognition, 301. The contour recognizer at 301 preferably determines the contour of whatever the user is looking at, whether it be a book, painting, or on a screen of some sort. The contour, as such, may preferably be determined in a manner such as that described in copending and commonly assigned U.S. patent application Ser. No. 09/438, 633 ("A system for the Automatic Adaptation of Projector Images and a Method for the Implementation Thereof", filed Nov. 12, 1999).

After the type of contour is determined, object recognition is preferably undertaken at 302. Here, it will preferably be determined as to what is actually within the previously recognized contour, i.e., whether it is text or something else. This may be accomplished by object recognition and contour recognition such as described in the aforementioned U.S. patent application Ser. No. 09/438,633. Accordingly, once the contour of an object is identified, essentially only the items inside of the contour (e.g. text) will end up being transformed or translated.

If the object is recognized as text, then the data is preferably sent to a text recognizer at 303. Here, files are sent to be made into text files. Preferably, the text at 303 may works in a manner similar to that described in U.S. Pat. No. 6,141,443, "Character extraction apparatus, dictionary production apparatus, and character recognition apparatus using both apparatuses". At 306, after text is made into text files, it is then preferably transformed into its translated or simplified form.

If the intended task to be performed is translation from one language to another, then essentially any suitable type of machine translation may be employed. For instance, U.S. Pat. No. 5,727,082, entitled "Image reading, copying, transmission, etc. with translator from one language to another", discusses machine translation that could be employed here. If, on the other hand, the intended task to be performed is text simplification, i.e., the simplification of complex text within one language, then essentially any suitable algorithm for automatically simplifying text may be employed, wherein a set of simplifying rules could be applied. For example, complex words could be replaced with synonyms that are simpler, and a relatively complex syntax could be changed into simpler syntax (for example, a sentence such as, "The device was made by Peter" could be replaced by "Peter made the device").

Text summarization or interpretation may also be employed within the scope of the present invention. In this vein, indicated at 307 is an alternative to step 306. Here, text interpretation may be undertaken semantically, meaning that a "summary" is provided of what is written. As an example of such a task, the most important words or phrases could be highlighted (as opposed to prepositions and conjunctions). Text summarization may be accomplished in a manner similar to that described in U.S. Pat. No. 5,924,108, "Document summarizer for word processors".

After this interpretation is complete, the text may then be transformed into an image, at step 308. This is very useful to children and/or users with dyslexia, in view of the difficulties that such users may encounter generally with reading. So, for example, when a user is using his/her computer, it is conceivable that instead of seeing an icon with words they would see a descriptive icon somehow explaining what the file is. For example, an image of a dog could be combined into the text stream to help children or dyslexia users to understand that the file is related to dogs. Automatic sign language displays could also be utilized for hearing-impaired users with reading problems. For, this, something as simple as an online dictionary of words and corresponding images could be utilized, or a more sophisticated system be used that treats this as a language translation problem in itself.

If, at step 302, an object is recognized as a picture, it is then preferably sent to picture/color recognition at 304. Here, the object is preferably identified (e.g. via object recognition, as discussed heretofore) and determined for what color or colors it includes. Then at 305, the picture or image is transformed into text so this can be used for colorblind users. This would help by describing the picture and the colors it contains. Examples of the manner in which text is mapped into images are provided in the commonly owned U.S. patent application Ser. No. 09/726,137, entitled "Universal Translator/mediator server for improved access by users with special needs", which was filed on Nov. 29, 2000.

FIG. 4 depicts a possible process of imager processing, contour recognition and object recognition in accordance with at least one embodiment of the present invention (i.e. that may be employed at steps 300, 301 and 302 of FIG. 3, with item 400 in FIG. 4 essentially corresponding to item 300 in FIG. 3).

At 400, the image is processed. At 401, it is determined as to whether or not an image part represents a contour. If yes, the contour is drawn at 402.

At 403, it is then determined as to whether or not the image is part of the inside contour. If no, then a reversion is made back to step 401. If yes, the image is verified as to whether this is text, at step 404.

At step 404, if the answer is "yes", then the image is processed as text at 405. If no, then it is processed as a picture/color, 406. If the image represents no contour, it is stored as an object (407) and then processed to be checked for text at 404.

It is to be understood that the present invention, in accordance with at least one presently preferred embodiment, an aiming device to be aimed at an original stationary image, a transforming device which transforms the image into a revised image and a displaying device which displays the revised image. Together, the aiming device, transforming device and displaying device may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for transforming an image, said apparatus comprising:
   an aiming device to be aimed at an original stationary image;
   a transforming device which transforms the image into a revised image, whereby the revised image facilitates an understanding of the image by a user of the aiming device;
   a displaying device which displays the revised image; and
   an object recognizer for determining at least whether the original stationary image is to be processed as text or as a pictographic image.

2. The apparatus according to claim 1, wherein the revised image is related linguistically to the original stationary image.

3. The apparatus according to claim 2, wherein said transforming device is adapted to translate text, associated with the original stationary image and in a first language, into a second language.

4. The apparatus according to claim 2, wherein said transforming device is adapted to transform text, associated with the original stationary image, into simplified text.

5. The apparatus according to claim 1, wherein the revised image is related pictographically to the original stationary image.

6. The apparatus according to claim 5, wherein said transforming device is adapted to assign at least one image to text associated with the original stationary image.

7. The apparatus according to claim 1, wherein said transforming device is adapted to impart a label to at least one pictographic property of the original stationary image.

8. The apparatus according to claim 7, wherein said transforming device comprises a camera which records the original stationary image.

9. The apparatus according to claim 1, wherein said aiming device is adapted to be mounted on a human head.

10. The apparatus according to claim 9, wherein said aiming device comprises eyeglasses.

11. The apparatus according to claim 9, wherein said aiming device comprises goggles.

12. The apparatus according to claim 1, wherein said transforming device comprises a CPU which accepts data relating to the original stationary image and transforms the same into data relating to the revised image.

13. The apparatus according to claim 1, wherein:
   said aiming device comprises goggles;
   said goggles comprise at least one lens area for being viewed;
   said displaying device comprising a projector which projects the revised image on said at least one lens area.

14. The apparatus according to claim 13, wherein said at least one lens area is transparent.

15. The apparatus according to claim 13, wherein said at least one lens area is opaque.

16. The apparatus according to claim 1, further comprising a contour recognizer for recognizing an outer contour of the moving image.

17. A method for transforming an image, said method comprising the steps of:
   providing an aiming device;
   aiming the aiming device at an original stationary image;
   transforming the image into a revised image, whereby the revised image facilitates an understanding of the image by a user of the aiming device;

displaying the revised image; and determining at least whether the original stationary image is to be processed as text or as a pictographic image.

18. The method according to claim 17, wherein the revised image is related pictographically to the original stationary image.

19. The method according to claim 18, wherein said transforming step comprises assigning at least one image to text associated with the original stationary image.

20. The method according to claim 17, wherein said step of providing an aiming device comprises mounting the aiming device on a human head.

21. The method according to claim 20, wherein said step of providing an aiming device comprises providing eyeglasses.

22. The method according to claim 20, wherein said step of providing an aiming device comprises providing goggles.

23. The method according to claim 17, wherein the revised image is related linguistically to the original stationary image.

24. The method according to claim 23, wherein said transforming step comprises translating text, associated with the original stationary image and in a first language, into a second language.

25. The method according to claim 23, wherein said transforming step comprises transforming text, associated with the original stationary image, into simplified text.

26. The method according to claim 17, wherein said transforming step comprises imparting a label to at least one pictographic property of the original stationary image.

27. The method according to claim 17, wherein said transforming step comprises recording the original stationary image with a camera.

28. The method according to claim 17, wherein said transforming step comprises accepting, at a CPU, data relating to the moving image and transforming the same into data relating to the revised image.

29. The method according to claim 17, wherein:

said step of providing said aiming device comprises providing goggles, said goggles comprising at least one lens area for being viewed; and said displaying step comprises projecting the revised image on said at least one lens area.

30. The method according to claim 29, wherein said at least one lens area is transparent.

31. The method according to claim 29, wherein said at least one lens area is opaque.

32. The method according to claim 17, further comprising the step of recognizing an outer contour of the moving image.

33. A program storage device readable by machine, tangibly embodying a program of instructions executable by machine to perform method steps for transforming an image, said method comprising the steps of:

providing an aiming device;

aiming the aiming device at an original stationary image;

transforming the image into a revised image, whereby the revised image facilitates an understanding of the image by a user of the aiming device;

displaying the revised image; and determining at least whether the original stationary image is to be processed as text or as a pictographic image.

* * * * *